United States Patent [19]

Walk

[11] Patent Number: 4,874,204
[45] Date of Patent: Oct. 17, 1989

[54] HINGE JOINT FOR USE IN THE SEATS OF MOTOR VEHICLES

[75] Inventor: Hansjörg Walk, Reutlingen, Fed. Rep. of Germany

[73] Assignee: Keiper Recaro GmbH & Company, Remscheid, Fed. Rep. of Germany

[21] Appl. No.: 211,364

[22] Filed: Jun. 24, 1988

[30] Foreign Application Priority Data

Jul. 17, 1987 [DE] Fed. Rep. of Germany ....... 3723710

[51] Int. Cl.⁴ .............................................. B60H 1/02
[52] U.S. Cl. ..................................... 297/362; 297/355
[58] Field of Search ......................... 297/355, 362, 354

[56] References Cited

U.S. PATENT DOCUMENTS 4,453,767 1/1984 Walk et al. ........................... 297/362
4,469,376 9/1984 Pelz ..................................... 297/362

FOREIGN PATENT DOCUMENTS 0207182 1/1987 European Pat. Off. ............ 297/362

Primary Examiner—James T. McCall
Attorney, Agent, or Firm—Peter K. Kontler

[57] ABSTRACT

A hinge joint for use in the seats of motor vehicles has a first leaf which is affixed to the body-supporting part of the seat, a second leaf which is affixed to the pivotable back rest of the seat, and a pintle which provides a pivot for the second leaf. Each of the leaves is provided with a gear and one of the gears surrounds the other gear and has a larger number of teeth. One of the leaves is mounted on two coaxial portions of the pintle, and the gear of the other leaf spacedly surrounds a sleeve which is axially movably mounted on an eccentric portion of the pintle between the two coaxial portions and serves as a retainer for a diaphragm spring which biases the gear of the other leaf axially and radially into mesh with the gear of the one leaf. A needle bearing is interposed between the sleeve and the eccentric portion of the pintle, and a ring can be placed around the diaphragm spring to be in turn surrounded by a passive gear or by a ring-shaped extension of the one component.

11 Claims, 2 Drawing Sheets

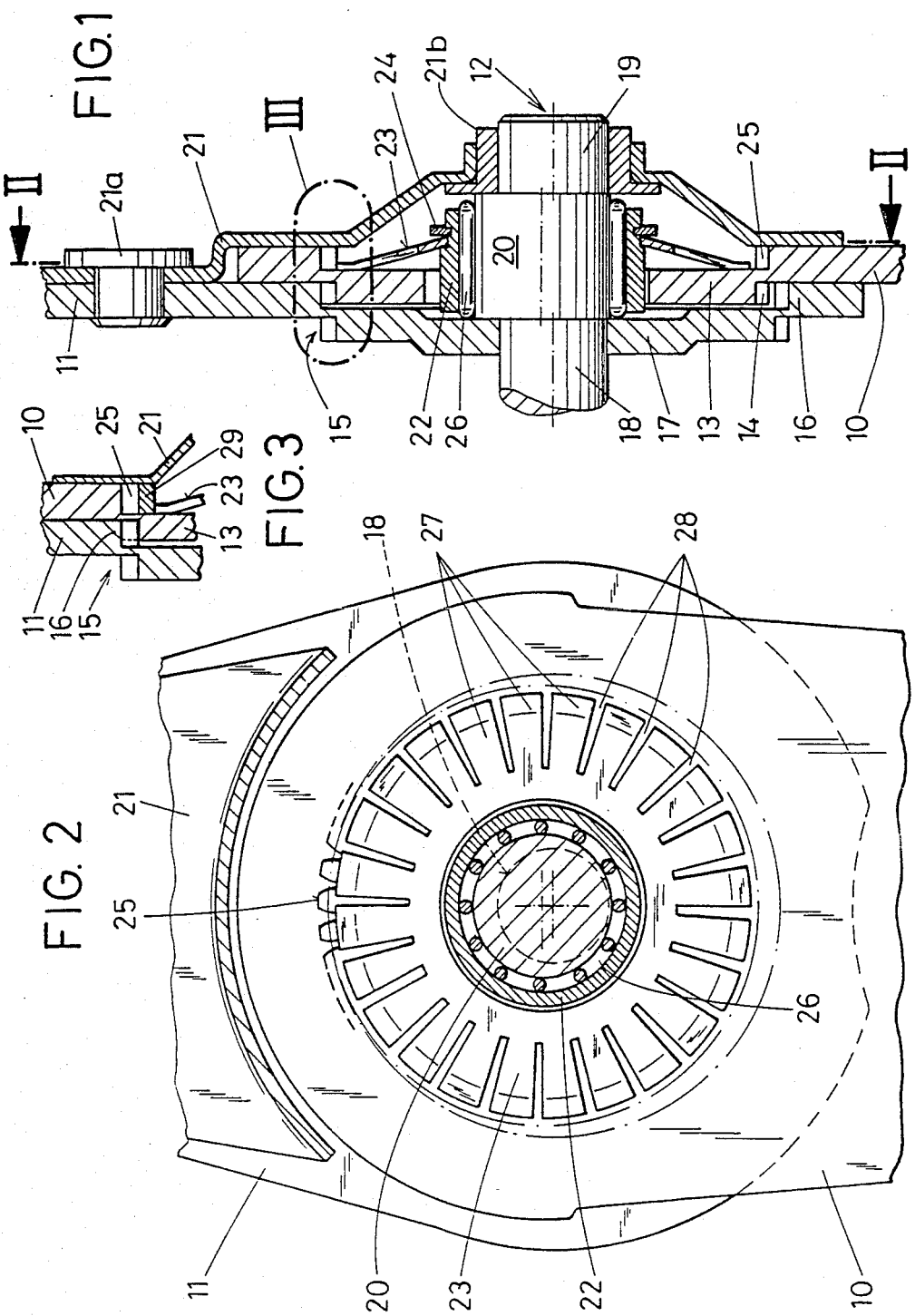

HINGE JOINT FOR USE IN THE SEATS OF MOTOR VEHICLES

BACKGROUND OF THE INVENTION

The invention relates to hinge joints in general, and more particularly to improvements in hinge joints which can be used in the seats of motor vehicles to facilitate changes of inclination of the back rest relative to the body-supporting part of the seat, particularly a driver's seat or the seat next to the driver's seat.

It is well known to design the hinge joint for use in the seat of a motor vehicle in such a way that the component which is attached to or forms an integral part of the back rest is pivotable relative to the component which is fixed to or is integral with the body-supporting part in response to angular movement of a pintle which can be rotated by a hand wheel or by a motor in order to permit or initiate an angular movement of a gear on the pivotable component relative to a mating gear on the other component of the hinge joint. As a rule, the pintle comprises eccentric portions which are spacedly surrounded by one of the components and its gear, and such gear can be urged radically by a resilient member which is stressed in the axial direction and is normally an annular body which surrounds the pintle.

In accordance with a presently known proposal, one of the components has a spur gear which is formed by shifting a portion of the component axially of the pintle so that the thus obtained active spur gear causes the respective component to develop a complementary passive gear which is an internal gear at the other side of the respective component. Reference may be had to commonly owned U.S. Pat. No. 4,563,039 granted Jan. 7, 1986 to Jörg for "Hinge joint for use in the seats of motor vehicles and the like". The other component has a complementary active internal gear with a number of teeth exceeding by one or more the number of teeth on the active spur gear so that the two active gears can move radially of each other, i.e., the active spur gear can move within the confines of the active internal gear. The active spur gear surrounds a first eccentric portion of the pintle. The just described hinge joint further comprises a segmented washer-like spring which extends into the passive gear of the one component. The spring is mounted on a second eccentric portion of the pintle, and the apex of the second eccentric portion is engaged by the adjacent segment of the spring. The apices of the two eccentric portions must be located in a common plane which includes the axis of rotation of the pintle. The eccentricity of the second eccentric portion of the pintle is more pronounced than that of the first eccentric portion. When the pintle is rotated, the spring segment which engages the apex of the second eccentric portion can yield in the axial direction whereby the entire spring, and hence the corresponding component of the hinge, moves in the radial direction to eliminate radial play between the mating teeth of the two gears. A drawback of the just described hinge joint is that the pintle must be sufficiently long to be provided with two eccentric portions as well as that the pintle is more complex and more expensive than a pintle with a single eccentric portion.

OBJECTS AND SUMMARY OF THE INVENTION

An object of the invention is to provide a hinge joint which is simpler than but at least as effective and as versatile as heretofore known hinge joints.

Another object of the invention is to provide a simple and relatively short pintle for use in the above outlined hinge joint.

A further object of the invention is to provide a hinge joint which is more compact than heretofore known hinge joints.

An additional object of the invention is to provide a hinge joint wherein the pintle has a single eccentric portion but the hinge joint can still eliminate radial play between the mating gears of the adjusting mechanism as satisfactorily as heretofore known hinge joints.

Still another object of the invention is to provide a device, particularly a seat, which embodies the above outlined hinge joint.

An additional object of the invention is to provide a novel and improved device for preventing disengagement of gears in the adjusting mechanism of the above outlined hinge joint.

The invention resides in the provision of a hinge joint which can be employed with advantage to connect the back rest with the body-supporting part of a seat in a motor vehicle, e.g., a driver's seat or the seat next to the driver's seat. The improved hinge joint comprises a pintle having at least one first portion and at least one second portion which is eccentric to the first portion, a first component or leaf which surrounds the first portion of the pintle and has a first gear, and a second component or leaf which surrounds the second portion of the pintle and has a second gear mating with the first gear. One of the gears surrounds the other gear and the one gear has m+n teeth wherein m is the number of teeth on the other gear and n is a whole number including one. The hinge joint further comprises a sleeve which axially movably surrounds one portion of the pintle, and means for maintaining the gears in mesh and for holding the gears against radial play including a biasing member which reacts against the axially movable sleeve and bears axially and radially against one of the components. One of the components is connectable with the body-supporting part, and the other component is connectable with the back rest of a seat. The hinge joint can further comprise at least one antifriction bearing (preferably a needle bearing) between the sleeve and the one portion of the pintle.

The biasing member can comprise a diaphragm spring having an inner marginal portion, an outer marginal portion, a plurality of substantially radially disposed slots which extend from at least one of the marginal portions toward but short of the other marginal portion, and prongs which alternate with the slots. The slots can extend inwardly from the outer marginal portion or outwardly from the inner marginal portion, or the slots can include at least one slot extending inwardly from the outer marginal portion as well as at least one slot extending outwardly from the inner marginal portion.

The hinge joint can further comprise a ring (particularly a friction reducing ring) which is provided on the one component (namely on the component which is acted upon by the biasing member) and surrounds the biasing member.

The pintle can comprise two coaxial first portions and the second portion is then disposed between the first portions. One of the components can be rotatably mounted directly on the first portions of the pintle.

The novel features which are considered as characteristic of the invention are set forth in particular in the appended claims. The improved hinge joint itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a central sectional view of a hinge joint which embodies one form of the invention;

FIG. 2 is a sectional view substantially as seen in the direction of arrows from the line II—II of FIG. 1;

FIG. 3 is a sectional view of a detail corresponding to that within the phantom-line ellipse III of FIG. 1 but showing a portion of a modified hinge joint.

DESCRIPTION OF THE PREFERRED EMBODIMENTS

Figure 4:
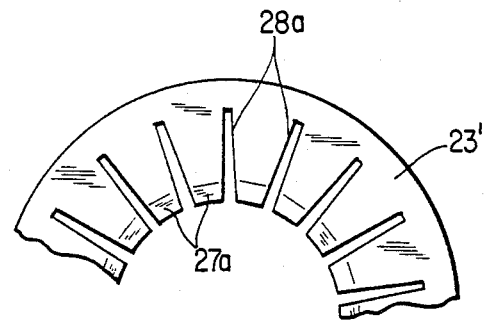
FIG. 4 is a fragmentary elevational view of a modified diaphragm spring which can be used in the improved hinge joint.

The hinge joint which is shown in FIGS. 1 and 2 comprises a first component 10 which can be said to constitute a stationary leaf of the joint and can be affixed to or made an integral portion of the body-supporting part of a seat in a motor vehicle, such as the driver's seat or the seat next to the driver's seat. A second component 11 constitutes the mobile leaf of the hinge joint and can be affixed to or made integral with the pivotable back rest of the seat. As a rule, the seat will comprise two hinge joints of the type shown in FIGS. 1 and 2, one at each side of the body of occupant of the seat. The components 10 and 11 are articulately connected to each other by a pintle 12 which has two coaxial first portions 18, 19 and a second portion 20 which is disposed between and is eccentric to the portions 18, 19. The means for adjusting the inclination of the component 11 relative to the component 10 by turning the component relative to the axis of the pintle 12 comprises a spur gear 13 which is or can be an integral part of the component 10 and spacedly surrounds the portion 20 of the pintle 12. The spur gear 13 is made by displacing a portion of the substantially plate-like component 10 in the axial direction of the pintle 12 (in a direction to the left, as seen in FIG. 1) so that the portion which constitutes the spur gear is offset with reference to the other or main portion of the component 10. One, two or even more teeth 14 of the spur gear 13 mate with the adjacent tooth or teeth of an internal gear 16 at a location 15. The internal gear 16 is made by shifting a portion of the component 11 axially of the pintle 12 so that the internal gear 16 is offset relative to the remaining or major portion 17 of the component 11. The number of teeth on the internal gear 16 equals m+n wherein m is the number of teeth 14 on the spur gear 13 and n is a whole number including one.

The portion 17 of the component 11 is mounted directly on the portion 18 of the pintle 12, and the component 11 further comprises a separately produced portion or panel 12 which is riveted to the internal gear 16 (as at 21a) and has a centrally located collar 21b mounted on the portion 19 of the pintle 12. Thus, the component 10 is flanked by the portions 16, 17 and 21 of the component 11. The spur gear 13 of the component 10 extends into the space which is surrounded by the teeth of the internal gear 16, and the spur gear spacedly surrounds a sleeve 22 which concentrically surrounds the second portion 19 of the pintle 12, namely the portion which is eccentric to the portions 18, 19 (or vice versa). The sleeve 22 is axially movably mounted on the portion 20 and carries a biasing member 23 which maintains one or more teeth 14 of the spur gear 13 in mesh with the adjacent tooth or teeth of the internal gear 16. The biasing member 23 of FIGS. 1 and 2 is a diaphragm spring which reacts against the sleeve 22 through the intermediary of a split ring 24 and bears against the spur gear 13 (i.e., against the component 10) to urge the spur gear 13 into the space within the annulus of teeth on the internal gear 16. The split ring 24 extends into a circumferential groove in the peripheral surface of the sleeve 22. As can be seen in FIG. 1, the outer diameter of the right-hand portion of the sleeve 22 is somewhat smaller than the outer diameter of that portion of this sleeve which extends into and through the central opening of the spur gear 13.

The outer diameter of the diaphragm spring 23 is slightly smaller than the diameter of the circle touching the top lands of teeth on a passive internal gear 25 which is formed in the main portion of the component 10 as a result of shifting the spur gear 13 axially. The development of the passive gear 25 is a consequence of the making of the spur gear 13 in the aforedescribed manner. Reference may be had to the commonly owned U.S. Pat. No. 4,563,039.

The bias of the diaphragm spring 23 suffices to maintain, without play, one or more teeth 14 in mesh with one or more teeth of the internal gear 16 at the location 15. This is possible because the central opening of the spur gear 13 receives the sleeve 22 with a certain clearance and because the outer marginal portion of the diaphragm spring does not abut the teeth of the passive internal gear 25. In addition, the innate resiliency of the diaphragm spring 23 can compensate for unavoidable tolerances in the making of elements of the improved hinge joint in that the diaphragm spring and the sleeve 22 can move axially relative to the pintle 12 when the user of the seat or another person is in the process of changing the inclination of the component 11 relative to the component 10 by turning the pintle 12 through the medium of a hand wheel or a motor in a manner well known from the art of hinge joints for the seats of motor vehicles. A hand wheel is shown in the aforementioned U.S. Pat. No. 4,563,039.

Through it is possible to axially movably mount the sleeve 22 directly on the portion 20 of the pintle 12, it is presently preferred to install an antifriction bearing 26 between the sleeve 22 and the portion 20. The illustrated antifriction bearing 26 is a needle bearing; this is desirable and advantageous because the needle bearing frictionally opposes axial movements of the sleeve 22 relative to the portion 20 of the pintle 12 and vice versa. In other words, when the pintle 12 is not caused to turn, static friction between the needle bearing 26 and the portion 20 on the one hand, and between the needle bearing 26 and the sleeve 22 on the other hand, is more pronounced than if the needle bearing were replaced with an antifriction bearing employing one or more annuli of spherical rolling elements. The provision of an antifriction bearing between the portion 20 and the sleeve 22 is desirable because this renders it possible to change the inclination of the component 11 relative to the component 10 in response to the exertion of a smaller force. Static friction between the needle bearing 26 on the one hand and the adjacent elements 20, 22 on the other hand can be said to equal or approximate that of a friction bearing. This is desirable on the following grounds: When the portion 20 of the pintle 12 is not caused to change its angular position and the pressure which is transmitted by the mating teeth of the gears 13, 16 to the portion 20 by way of the diaphragm spring 23, sleeve 22, split ring 24 and needle bearing 26 acts at an angle smaller than the static friction angle, the resulting self-locking action prevents the development of play between the teeth of the gears 13, 16 which mate at the location 15. However, when the aforementioned hand wheel or motor causes the pintle 12 and its portion 20 to turn, the inner marginal portion of the stressed diaphragm spring 23 moves axially so that its outer marginal portion moves radially whereby the diaphragm spring continues to prevent the development of play between the mating teeth of the gears 13 and 16. The eccentricity of the portion 20 relative to the portions 18, 19 of the pintle 12 (or vice versa) is selected with a view to ensure that the diaphragm spring 26 can compensate for the tendency of teeth 14 and the teeth of the gear 16 at the location 15 to develop a certain amount of play.

In order to conform to the required supporting forces, the hinge joint can employ a relatively thin-walled diaphragm spring 23 which is then without slots and prongs. Alternatively, and as shown in FIGS. 1 and 2, one can employ a relatively thick diaphragm spring with a number of substantially radially extending slots 28 which extend from the outer marginal portion toward but short of the inner marginal portion of the diaphragm spring. FIG. 2 shows a large number of radial slots 28 which extend from the outer marginal portion toward but short of the inner marginal portion of the diaphragm spring 23 and alternate with elastic prongs 27. As shown in FIG. 4, a modified diaphragm spring 23' comprises slots 28a which extend from the inner toward but short of the outer marginal portion of the diaphragm spring and alternate with prongs 27a. The slots 28a can be provided in addition to or in lieu of the slots 28.

The mode of operation of the improved hinge joint is basically the same a that of heretofore known hinge joints. Reference may be had, for example, to the aforementioned U.S. Pat. No. 4,563,039 and to commonly owned U.S. Pat. Nos. 4,708,392 and 4,715,656. Other types of hinge joints are described and shown in numerous foreign Letters Patent as well as in numerous foreign and U.S. patent applications of the assignee.

FIG. 3 shows a portion of a modified hinge joint at the location 15 where the teeth of the spur gear 13 mate with teeth of the internal gear 16. The passive teeth 25 of the component 10 surround a ring 29 which is made of a material having a low coefficient of friction and extends into the region of the circle formed by the annulus of top lands of teeth on the passive gear 25. The outer diameter of the diaphragm spring 23 which is shown in FIGS. 1 and 2 exceeds the outer diameter of the diaphragm spring 23 of FIG. 3 by a value equaling or approximating the width of the ring 29 (as measured in the radial direction of the passive gear 25).

In each of the illustrated embodiments, the diaphragm spring 23 biases the spur gear 13 of the component 10 into the space within the internal gear 16 of the component 11 which is rotatable on the coaxial portions 18, 19 of the pintle 12. However, it is equally within the purview of the invention to modify the illustrated hinge joints by mounting the component 10 on the portions 18, 19 and by interposing the sleeve 22 between the component 11 and the portion 20 of the pintle 12. The diaphragm spring 23 then acts upon the component 11 in a sense to bias the internal gear 16 into mesh with the spur gear 13 of the component 10 so as to eliminate or reduce radial play between the mating teeth of the two gears. The diaphragm spring then preferably bears against a circular extension of the component 11. The outer diameter of the diaphragm spring in such modified hinge joint is again selected with a view to be slightly less than the inner diameter of the ring-shaped extension of the component 11 (such extension replaces the passive gear 25 in the embodiments of FIGS. 1-2 and 3).

The sleeve 22 may but need not extend all the way between the axial ends of the portion 20 of the pintle 12. In the embodiment of FIGS. 1-2 the sleeve 22 is somewhat shorter so as to enable it to move axially relative to the portion 20 and/or vice versa. It will be noted that the location where the teeth of the gears 13, 16 mesh is in line with the region of maximum eccentricity of the portion 20 relative to portions 18, 19 of the pintle 12. The prongs 27 of the diaphragm spring 23 urge the spur gear 13 axially and radially so as to maintain the teeth 14 in mesh with the adjacent tooth or teeth of the internal gear 16 without any or without appreciable radial play. This is attributable to the fact that the outer marginal portion of the diaphragm spring 23 is received within the annulus of teeth forming part of the passive gear 25. As can be seen in FIGS. 1 and 2, the prongs 27 at the location 15 bear directly against the top lands of the adjacent teeth on the passive gear 25 but the prongs 27 which are disposed diametrically opposite the location 15 are spaced apart from the neighboring teeth of the passive gear 25.

An advantage of the antifriction bearing 26 is that it renders it possible to change the inclination of the component 11 relative to the component 10 in response to the exertion of a relatively small force. Moreover, the bearing 26 reduces the likelihood of seizing between the portion 20 of the pintle 12 and the adjacent component. As mentioned above, a needle bearing is preferred at this time because the difference between dynamic and static friction in the axial direction of a needle bearing is much more pronounced than in an antifriction bearing with spherical rolling elements between the inner and outer races.

The feature that the diaphragm spring 23 reacts against the sleeve 22 enhances the load carrying capacity of the hinge joint and reduces frictional losses.

The ring 29 of FIG. 3 constitutes a desirable but optional feature of the hinge joint. This ring prevents direct contact between the prongs of the diaphragm spring 23 and the teeth of the passive gear 25 on the component 10. The likelihood of undesirable friction in the region of the outer marginal portion of the diaphragm spring 23 is reduced still further by making the ring 29 of a material having a low coefficient of friction.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A hinge joint, particularly for movably connecting the back rest with the body-supporting part of a seat for use in a motor vehicle, comprising a pintle having at least one first portion and at least one second portion eccentric to said first portion; a first component surrounding the first portion of said pintle and having a first gear; a second component surrounding the second portion of said pintle and having a second gear mating with said first gear, one of said gears surrounding the other of said gears and said one gear having n+m teeth wherein n is the number of teeth on said other gear and m is a whole number including one; a sleeve axially movably surrounding one portion of said pintle; and means for maintaining said gears in mesh including a biasing member reacting against said sleeve and bearing axially and radially against one of said components, one of said components being connectable with the body-supporting part and the other of said components being connectable with the back rest.

2. The hinge joint of claim 1, further comprising an antifriction bearing between said sleeve and the one portion of said pintle.

3. The hinge joint of claim 2, wherein said bearing includes a needle bearing.

4. The hinge joint of claim 1, wherein said biasing member includes a diaphragm spring.

5. The hinge joint of claim 4, wherein said diaphragm spring comprises an inner marginal portion, an outer marginal portion, substantially radially disposed slots extending from at least one of said marginal portions toward but short of the other marginal portion, and prongs alternating with said slots.

6. The hinge joint of claim 5, wherein said slots extend from said outer marginal portion toward but short of said inner marginal portion.

7. The hinge joint of claim 5, wherein said slots extend from said inner marginal portion toward but short of said outer marginal portion.

8. The hinge joint of claim 5, wherein said slots include at least one slot extending from said inner marginal portion toward but short of said outer marginal portion and at least one slot extending from said outer marginal portion toward but short of said inner marginal portion.

9. The hinge joint of claim 1, further comprising a ring provided on said one component and surrounding said biasing member.

10. The hinge joint of claim 1, wherein said pintle comprises two coaxial first portions and said first component is rotatably mounted on the two first portions of said pintle.

11. The hinge joint of claim 10, wherein said second portion is disposed between said first portions.

* * * * *